(12) United States Patent  (10) Patent No.: US 6,976,072 B2
Mathieson  (45) Date of Patent: Dec. 13, 2005

(54) METHOD AND APPARATUS FOR MANAGING JOB QUEUES

(75) Inventor: Rono James Mathieson, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 655 days.

(21) Appl. No.: 09/823,384

(22) Filed: Mar. 30, 2001

(65) Prior Publication Data

US 2002/0143915 A1     Oct. 3, 2002

(51) Int. Cl.$^7$ ........................................... G06F 15/173
(52) U.S. Cl. ..................... 709/224; 709/223; 709/240; 718/100; 718/102; 719/314
(58) Field of Search ..................... 709/223, 226, 709/240, 207, 208, 224; 710/54; 719/313–316; 718/100, 102; 358/444

(56) References Cited

U.S. PATENT DOCUMENTS

| 4,787,061 | A | | 11/1988 | Nei et al. |
| 4,829,468 | A | | 5/1989 | Nonaka et al. |
| 5,164,842 | A | | 11/1992 | Gauronski et al. |
| 5,206,735 | A | | 4/1993 | Gauronski et al. |
| 5,287,194 | A | | 2/1994 | Lobiondo |
| 5,319,638 | A | | 6/1994 | Lin |
| 5,325,527 | A | * | 6/1994 | Cwikowski et al. ........ 709/222 |
| 5,436,730 | A | | 7/1995 | Hube |
| 5,450,571 | A | | 9/1995 | Rosekrans et al. |
| 5,559,606 | A | * | 9/1996 | Webster et al. ............. 358/296 |
| 5,652,864 | A | | 7/1997 | Hine |
| 5,666,539 | A | | 9/1997 | Kenkel |
| 5,819,015 | A | | 10/1998 | Martin et al. |
| 5,873,659 | A | | 2/1999 | Edwards et al. |
| 5,918,074 | A | | 6/1999 | Wright et al. |
| 5,923,013 | A | | 7/1999 | Suzuki et al. |
| 5,923,826 | A | * | 7/1999 | Grzenda et al. ........... 358/1.15 |
| 5,960,435 | A | | 9/1999 | Rathmann et al. |
| 5,970,222 | A | | 10/1999 | Gusmano et al. |
| 5,974,234 | A | * | 10/1999 | Levine et al. ............... 358/1.16 |
| 6,026,399 | A | | 2/2000 | Kohavi et al. |
| 6,052,204 | A | | 4/2000 | Mori et al. |
| 6,075,617 | A | | 6/2000 | Fischer et al. |
| 6,137,499 | A | | 10/2000 | Tesler |
| 6,137,807 | A | | 10/2000 | Rusu et al. |
| 6,147,969 | A | | 11/2000 | Benmohamed et al. |
| 6,157,941 | A | * | 12/2000 | Verkler et al. ............... 709/202 |
| 6,181,436 | B1 | | 1/2001 | Kurachi |
| 6,182,058 | B1 | | 1/2001 | Kohavi |
| 6,272,606 | B1 | * | 8/2001 | Dorricott et al. ........... 711/158 |
| 6,490,611 | B1 | * | 12/2002 | Shen et al. .................. 718/103 |
| 6,501,559 | B1 | * | 12/2002 | Salgado et al. ............ 358/1.15 |
| 6,874,034 | B1 | * | 3/2005 | Hertling ...................... 709/245 |

FOREIGN PATENT DOCUMENTS

JP          2001306286        11/2001

* cited by examiner

*Primary Examiner*—Saleh Najjar
*Assistant Examiner*—Benjamin Bruckart
(74) *Attorney, Agent, or Firm*—Marger Johnson & McCollom, P.C.

(57) ABSTRACT

A queue manager monitors status of a server queue in a network server and status of a device queue in a peripheral device at the same time. A user interface displays the status of jobs in the server queue and device queue on the same display and allows a user to manipulate any of the jobs on either queue using the same user interface.

18 Claims, 6 Drawing Sheets

|  30 | 32 | 34 | 36 | 38 |
|---|---|---|---|---|
| DOCUMENT NAME | STATUS | LOCATION | OWNER | ETC. |
| DOC 1 | PRINTING | MFP | R. MATHIESON | |
| DOC 2 | WAITING | MFP | S. LEE | |
| DOC 3 | WAITING | MFP | R. MATHIESON | |
| DOC 4 | WAITING | SERVER | S. LEE | |
| DOC 5 | WAITING | SERVER | W. MAYS | |
| DOC 6 | HOLDING | SERVER | W. MAYS | |
| " | " | " | " | |

FIG. 2

| 30 | 32 | 34 | 36 | 38 | |
|---|---|---|---|---|---|
| DOCUMENT NAME | STATUS | OWNER | ETC. | ETC. | |
| DOC 1 | PRINTING | R. MATHIESON | | | DEVICE 26 |
| DOC 2 | WAITING | S. LEE | | | |
| DOC 3 | WAITING | R. MATHIESON | | | |
| DOC 4 | WAITING | S. LEE | | | SERVER 22 |
| DOC 5 | WAITING | W. MAYS | | | |
| DOC 6 | HOLD | W. MAYS | | | |
| " | " | " | | | |

FIG. 3

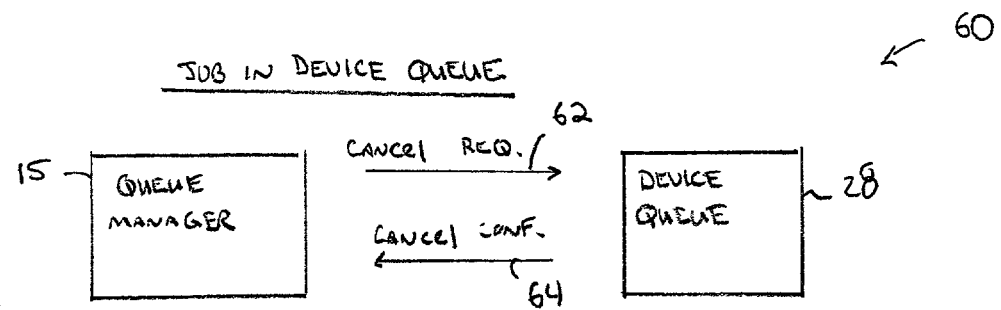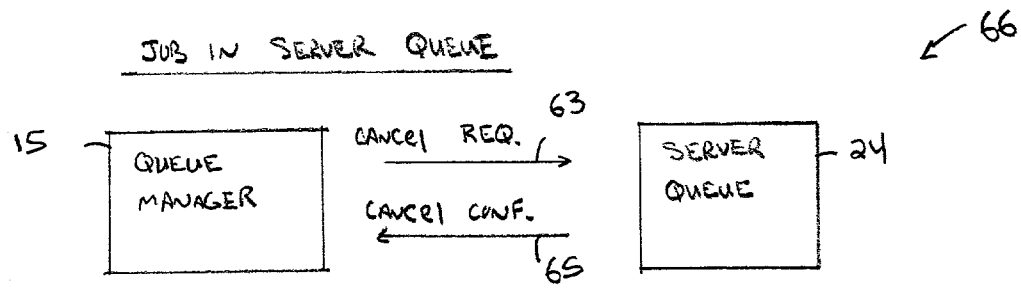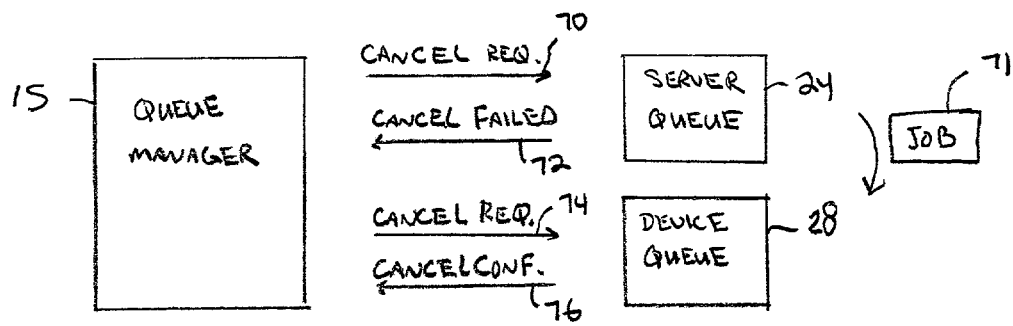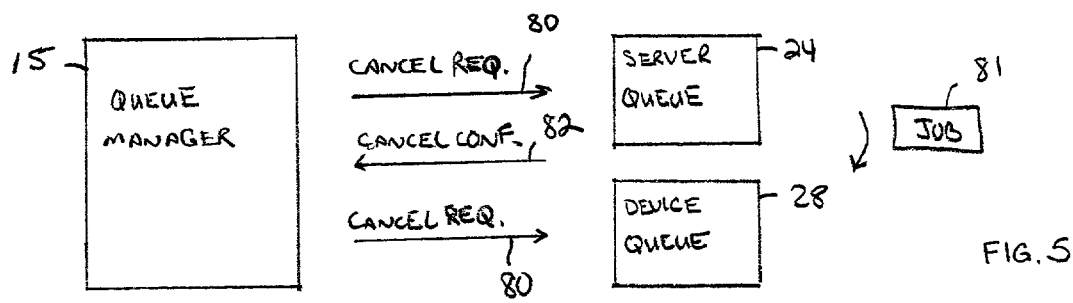
FIG. 5

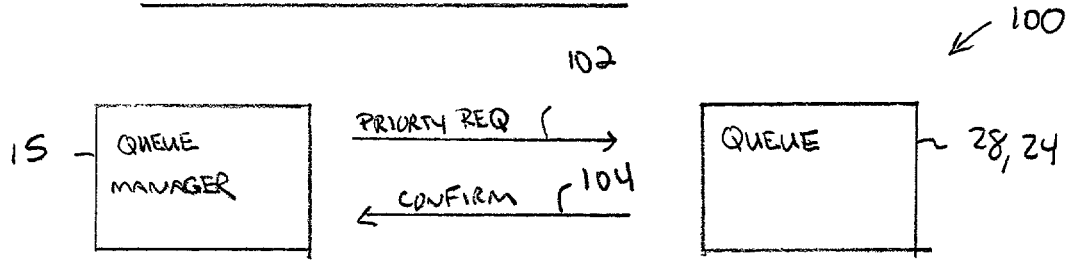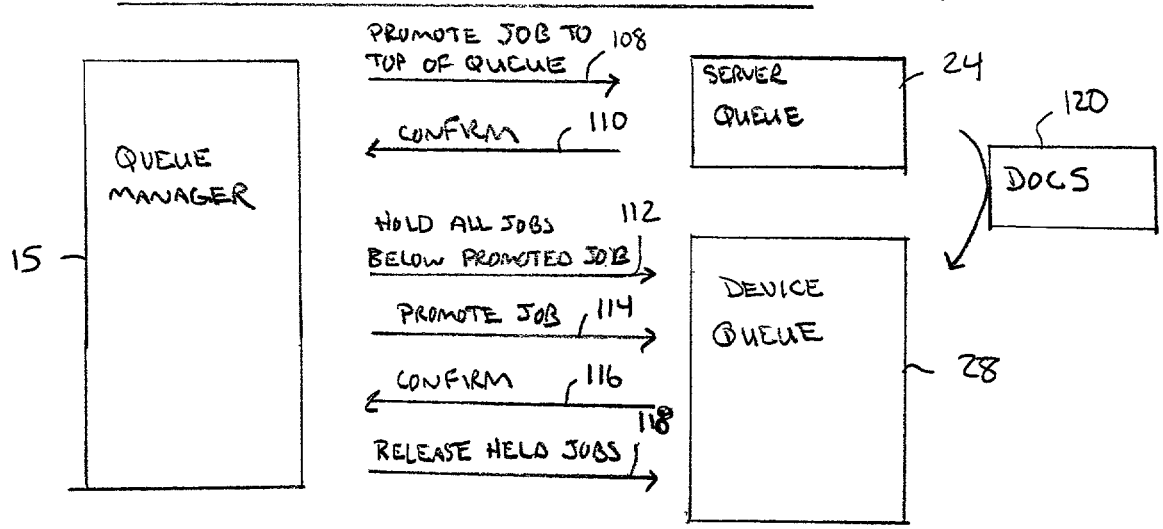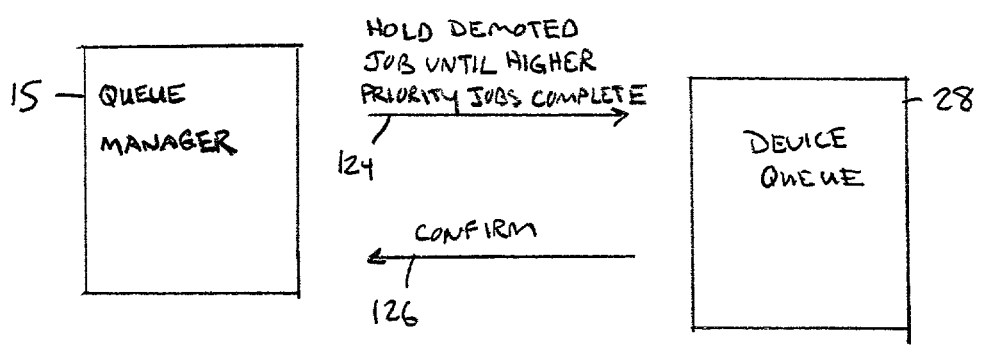
FIG. 7

METHOD AND APPARATUS FOR MANAGING JOB QUEUES

BACKGROUND

In a networked office environment, print jobs are queued on a network server before being passed to a device for printing. New printers and Multifunction Peripheral (MFP) devices also include queue for storing print jobs. Because there are two different queuing points in the same job stream, there is no way for a user or administrator to effectively view and manage the jobs or both queues at the same time.

Currently a user has to use separate programs with separate User Interfaces (UIs) to manage jobs on the network server and on the peripheral device. A network queue on the network server is typically managed using Network Operating System (NOS) software tools such as created by Novell or Microsoft. A device queue on the peripheral device is typically managed using vendor specific application software that uses a proprietary or standardized network protocol such as Simple Network Management Protocol (SNMP)/Job Management Information Base (MIB) or Internet Printing Protocol (IPP).

None of these user interfaces can manage more than one job queue at the same time. Thus, a user cannot effectively manipulate the scheduling of jobs from multiple job queues. The present invention addresses this and other problems associated with the prior art.

SUMMARY OF THE INVENTION

A queue manager monitors a server queue in a network server and a device queue in a peripheral device at the same time. A user interface displays the status of jobs in the server queue and device queue on the same display and allows a user to manipulate any of the jobs on either queue using the same user interface.

BRIEF DESCRIPTION OF THE DRAWINGS

FIG. 2 is a diagram showing a user interface for the queue management system shown in FIG. 1.

FIG. 3 is a diagram showing an alternative user interface for the queue management system shown in FIG. 1.

FIG. 5 is diagrams showing in further detail how the queue manager cancels of pauses jobs.

FIG. 7 is a diagram showing in further detail how the priority of jobs is changed by the queue manager.

DETAILED DESCRIPTION

Figure 1:
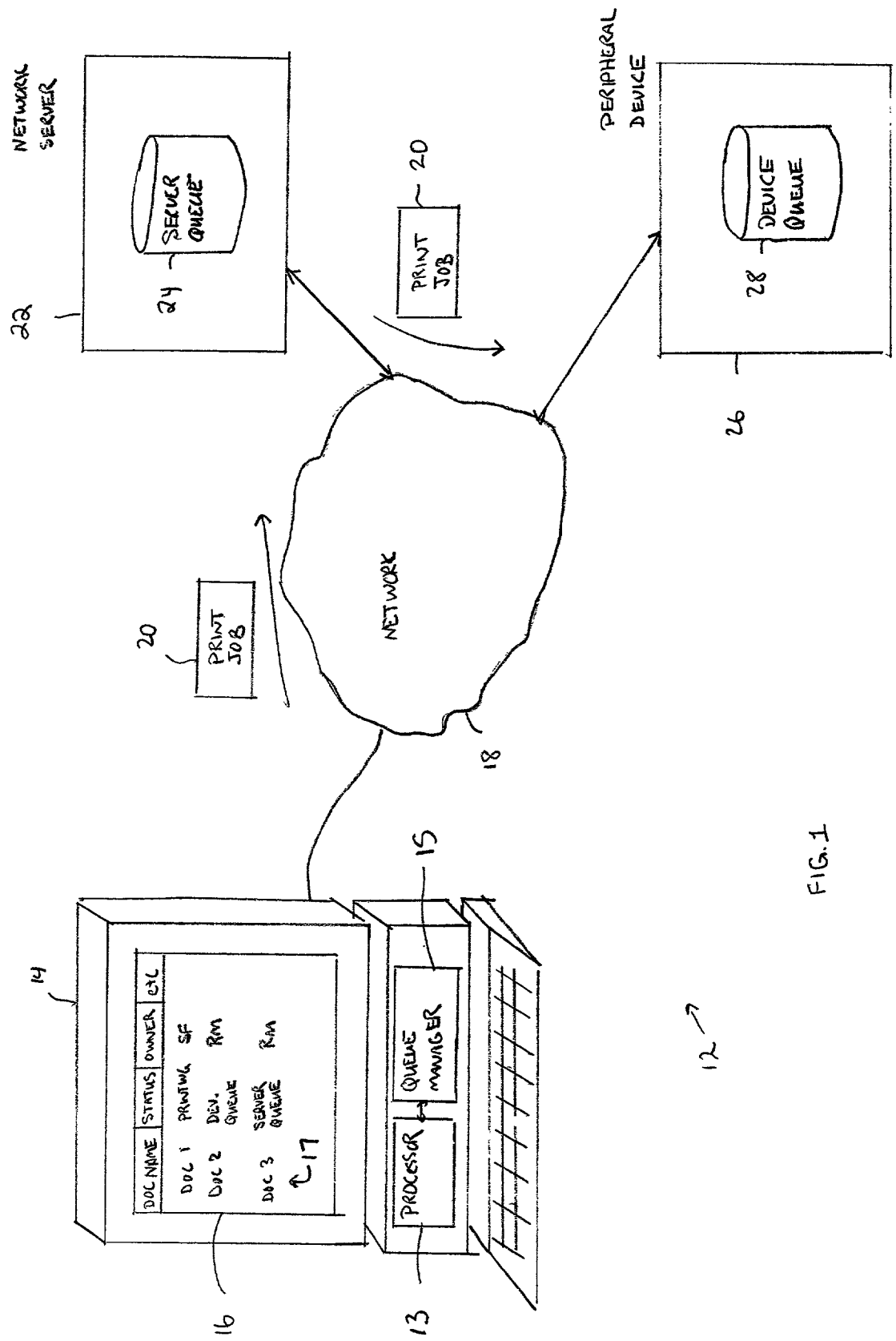
FIG. 1 is a diagram of a queue management system.

A queue management system 12 includes a computer 14 that is connected through a network 18 to a network server 22 and a peripheral device 26. The computer 14 can be any Personal Computer (PC), terminal, etc. or can be part of the network server 22 or peripheral device 26. The computer 14 includes a processor 13 that accesses a queue manager program 15 that is stored in computer memory. The processor 13 uses a User Interface (UI) 16 to receive user inputs and to display status for jobs stored on network sever 22 and peripheral device 26.

The network server 22 can be any computing device that is used by network 18 to store jobs in a server queue 24. The peripheral device 26 is any copier, printer, fax machine, scanner, MultiFunction Peripheral (MFP) device, or other output device that can output copy, print, fax, and/or scan jobs. The peripheral device 26 includes a device queue 28. The network 18 can be any Internet or Intranet network such as a Wide Area Network (WAN) Internet Protocol (IP) network or a Local Area Network (LAN) Ethernet network.

A job 20 is sent from computer 14 over network 18 to the server queue 24. The job 20 in this example is a print job but can be any copy, print, fax, scan, etc. job that needs to be output by peripheral device 26. The print job 20 is eventually moved from server queue 24 to the device queue 28. The device queue 28 may hold many different jobs that may come from many different sources other than computer 14.

The user interface 16 operated by the queue manager 15 provides information on the jobs 17 held in each of the two queues 24 and 28. This allows a user or administrator to view the order and status of the combined set of jobs without concern for which queue they reside in. The queue manager 15 allows a user or administrator to manage jobs 17 in the two queues seamlessly as if they were in a single queue. The queue manager 15 allows a user to delete, pause, hold or reorder the priority of jobs in both queue 24 and queue 28 through the same user interface 16. The queue manager 15 can manage any number of job queues that may exist on the network 18.

FIG. 2 is a more detailed drawing of the user interface 16. In one embodiment, a document name field 30 lists the different names of the jobs DOC1–DOC6 in order of output priority. A status field 32 identifies the status of the jobs such as printing, waiting, holding, etc. A location field 34 identifies the device where the job is currently residing. For example, job DOC 1 is currently residing in a MFP peripheral device queue and job DOC 4 is currently residing in a network server queue. Owner field 36 identifies a user that initiated the job. Other fields 38 associated with the jobs may also be displayed on the user interface 16.

A user can change the priority of the jobs simply by dragging the jobs to different locations on user interface 16. For example, a user may move a cursor over job DOC5 and click a mouse button. The user can then drag the cursor to a location between job DOC2 and DOC3 and release the mouse button. The queue manager 15 performs the necessary commands to move job DOC5 up in priority above jobs DOC3 and DOC4.

To cancel a job, the user selects the job on user interface 16 and then enters a delete command. For example, the user moves the cursor over job DOC 3 and initiates a delete command from a computer menu. The queue manager 15 then sends the necessary commands to the MFP queue to cancel job DOC3.

FIG. 3 shows an alternate implementation of user interface 16 where the jobs are displayed according to the device where the job is currently residing. In this example, jobs DOC1, DOC2, and DOC 3 all currently reside in the device queue 28 in peripheral device 26 (FIG. 1). The DOC1 job has the highest priority in device queue 28 and is currently printing. Jobs DOC4, DOS5 and DOC 6 are currently residing in the server queue 24 in network server 22 (FIG. 1).

Figure 4:
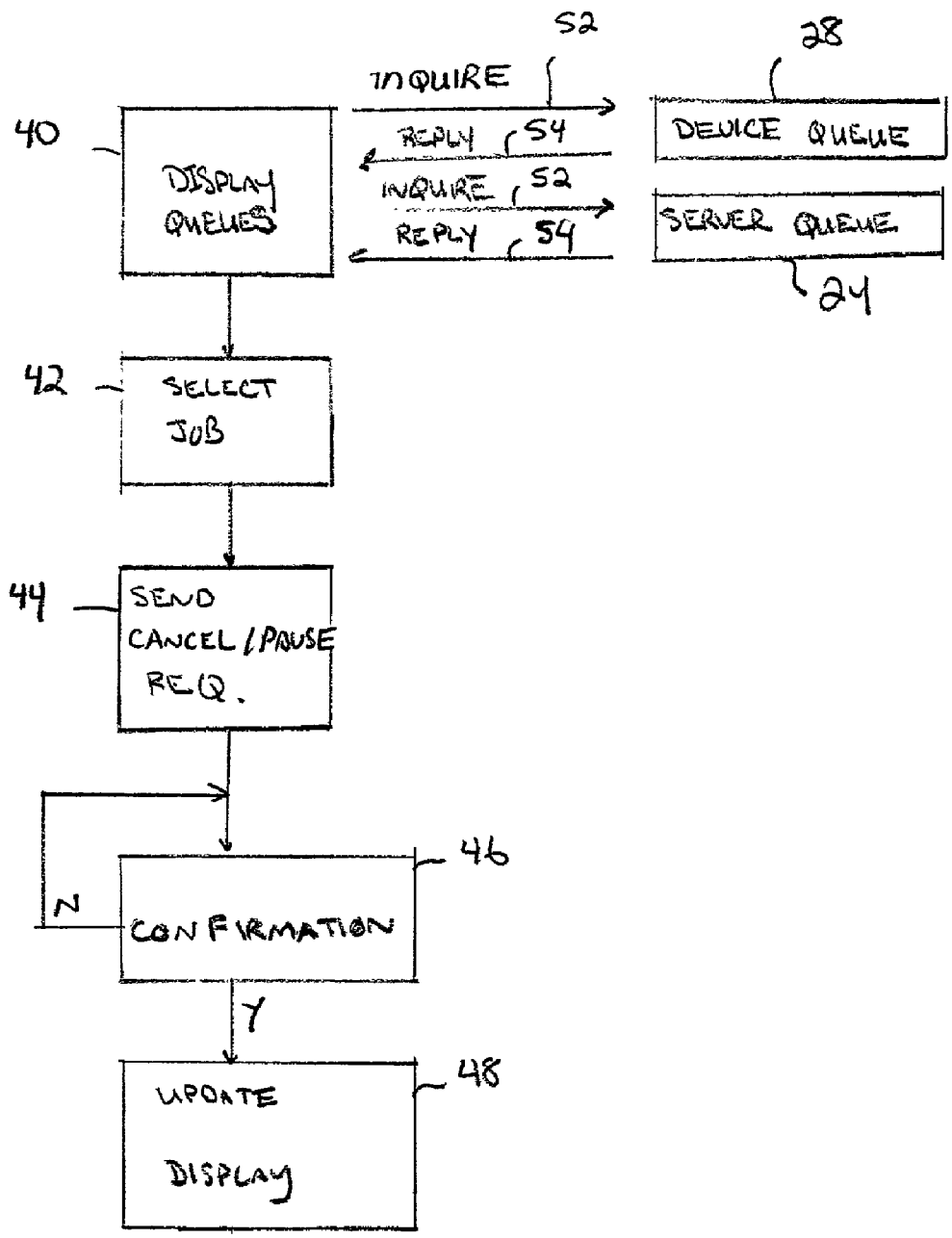
FIG. 4 is a flow diagram showing how jobs are cancelled or paused by a queue manager.

FIG. 4 is a flow diagram showing how jobs are cancelled or paused by the queue manager 15. The queue manager displays the status of jobs in the different queues in block 40. In this example, the device queue 28 and the server queue 24 are both sent inquiries 52 from the queue manager 15. The identity of jobs in device queue 28 and server queue 24 are sent back to the queue manager 15 in replies 54. The queue manager 15 then uses the information in replies 54 to update the job list output on the user interface.

A user may select one or more of the displayed jobs to cancel or pause in block 42. The queue manager sends out a cancel or pause request to one or both of the device queue 28 and server queue 24 in block 44. The queue manager waits in block 46 for a confirmation from the queue currently storing the job confirming that the selected job has been cancelled or paused. When the confirmation is received, the queue manager updates the job list on the user interface display in block 48 to remove the cancelled job from the job list or to show the job as paused or put on hold.

Referring to FIG. 5, a first case 60 shows how the queue manager handles jobs currently residing in the device queue 28. The queue manager 15 sends out a cancel request 62 that identifies the selected job and the selected function (cancel, pause, hold) to the device queue 28. If the selected job has not yet been output, the peripheral device deletes or holds the selected job in the device queue 28 according to the request 62 and then sends a confirmation 64 back to the queue manager 15.

Case 66 shows the cancel or pause operation for a job that currently resides in the server queue 24. The queue manager 15 identifies a job on the user interface that has been selected by the user for cancellation or pausing. The queue manager 15 identifies the server queue 24 as storing the selected queue and accordingly sends a cancel request 63 to the server queue 24. The network server deletes or pauses the selected job in server queue 24 according to the request 63 and sends out a confirmation 65 back to the queue manager 15. The queue manager 15 then updates the job list on the user interface to reflect the cancelled or paused job.

When a user is selecting jobs from the user interface display, some of the jobs may have already moved from the server queue 24 to the device queue 28. The queue manager automatically adjusts how the cancel or pause requests are sent according to where the job is currently located on the server queue 24 or device queue 28. Case 68 deals with the situation when a job 71 was in the server queue 24 when the user selected the job to be canceled or paused. However, the job 71 moved to the device queue 28 before the cancel request 70 was received by the server queue 24.

The queue manager 15 initially sends the cancel or pause request 70 to the server queue 24, since that was the last identified location for the selected job 71. Since the selected job 71 no longer resides on the server queue 24, the server queue 24 sends back a notice 72 to the queue manager 15 indicating that the cancel or pause request 70 failed.

The queue manager 15 upon receiving the fail notice 72 resends a cancel or pause request 74 to the device queue 28. The device queue 28 now stores the selected job 71. Therefore, the peripheral device sends a confirmation 76 back to the queue manager 15 after it cancels or pauses job 71. The queue manager 15 then updates the job list displayed on the user interface to reflect the cancelled or paused job 71.

Case 78 shows an alternative way to implement the condition where a job 81 moves from the server queue to the device queue 28 after the job 81 is selected. Instead of first sending a cancel request to the server queue 24, the queue manager 15 sends a cancel or pause request 80 to both the server queue 24 and the device queue 28 at the same time. This eliminates the queue manager 15 from having to identify which queue currently stores the job 81. As long as a cancel or pause confirmation 82 is received back from one of the queues 24 or 28, the queue manager 15 knows the cancel or pause request has been successfully completed.

Figure 6:
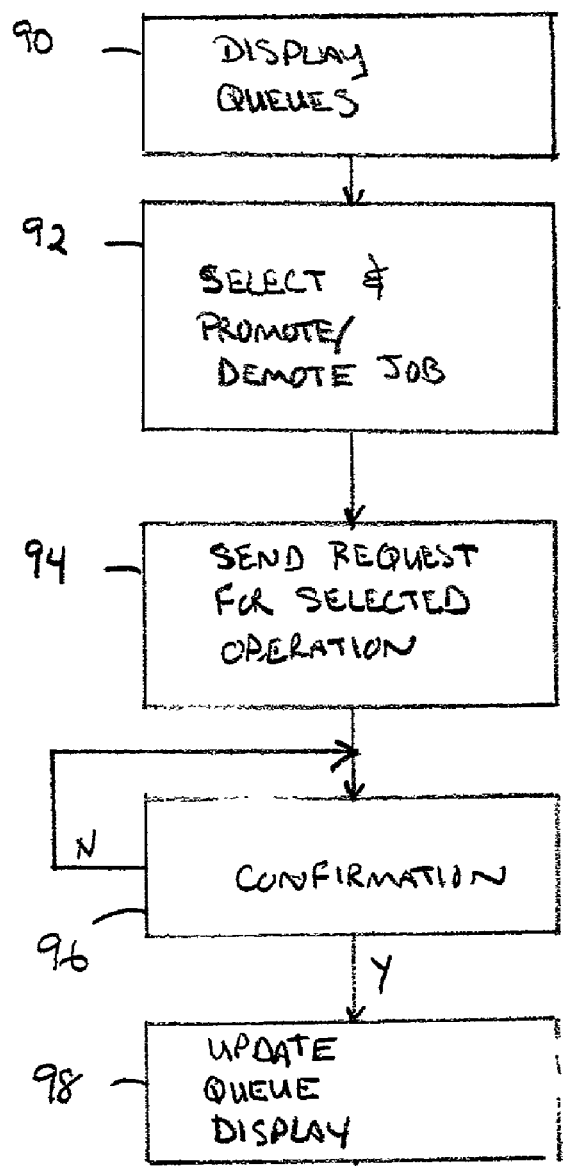
FIG. 6 is a flow diagram showing how the priority of jobs is changed by the queue manager.

FIG. 6 shows how the queue manager changes the priority of jobs. For example, a user may want to have one job in either the server queue or device queue be the next in line for printing from a peripheral device. If the job is currently fifth on the list of jobs to be output, the user can go to the user interface 16 (FIG. 1) and move the job up to the top of the list. The selected job will then be the next job to be output from the peripheral device. A user can either promote job priority or demote job priority by moving the job either up or down in the job list in field 30 (FIG. 2).

The jobs in the queues are displayed from the user interface in block 90. The queue manager 15 identifies a user changing the priority of a job in block 92. The queue manager in block 94 sends a request to one or both of the server queue and device queue that contains the priority operation selected by the user. After a confirmation from one of the queues is received in block 96, the queue manager in block 98 updates the user interface to reflect the job list with the selected job in the new promoted or demoted position.

FIG. 7 shows how the queue manager handles priority requests. In case 100, a user requests a promotion or demotion of a job within the list of jobs in the same queue. For example, the user may move the lowest priority job DOC6 in FIG. 2 only above the two other jobs DOC4 and DOC5 on the server queue 22. In another example, DOC3 in the MFP queue is moved up in priority above DOC2 in the same MFP queue.

Referring back to FIG. 7, the queue manager 15 sends a priority request 102 to the queue where the job priorities have to be changed. The queue 26 or 28 makes the priority change contained in the priority request 102 and sends a confirmation 104 back to the queue manager 104.

The job may have moved from one queue to another after the user selects a new priority for the job. Further, the job may be moved from an existing priority in the server queue 24 to a selected priority in the device queue 28. This is referred to as moving a job across queue boundaries. Case 106 explains how the queue manager 15 operates when a job promotion goes across the queue boundaries. For example, job DOC5 in the server queue in FIG. 2 is moved above DOC3 in the MFP queue.

Referring to FIG. 1, the queue manager 15 sends request 108 to server queue 24 to promote job DOC5 to the top of the server queue 24. The job DOC5 is promoted to the top of the server queue 24 and is the next job that is sent to the device queue 28. The server queue 24 then sends a confirmation 110 to the queue manager 15.

The queue manager 15 sends a request 112 to device queue 28 to hold all jobs below the identified priority for job DOC5 and sends a request 114 to promote job DOC5. The device queue 28 holds all jobs having a lower priority below job DOC5 and then promotes job DOC5 to the requested priority when received from the server queue 24. After a confirmation 116 is sent by the device queue 28 that DOC5 has been promoted, the queue manager 15 sends a request 118 to release the jobs on hold.

In an alternative embodiment a slot is created for job DOC5 on the device queue 28. The job DOS5 is then moved to the slot. No jobs below the slot reserved for DOS5 can be output from the device queue 28 until the DOS5 job is output.

The device queue 28 may be full when the user moves job DOC5 ahead of one or more jobs in the device queue 28. If the device queue 28 is currently full, the server queue 24 may not be able to immediately send the selected job DOS5 to the device queue 28. In this situation, the device queue 28 may have to output some number of jobs before receiving the promoted job DOC5.

In one example, the user may have requested promotion of job DOC5 above DOC2 (FIG.2). However, it may be necessary to output jobs DOC1 and DOC2 before there is enough space to receive job DOC5. The device queue 28 will not promote job DOC5 above DOC2 but only above DOC3 since DOC1 and DOC2 have to be output before job DOC5 can be moved to the device queue 28.

Case 122 deals with demoting a job across the queue boundaries. The user selects a job to be demoted in the device queue 28. The queue manager sends a request 124 to the device queue 28 to hold the selected job until all of the jobs with higher priority have been output. The device queue 28 sends back a confirmation 126. The demoted job may be shown moved on the user interface 16 but may not be physically moved in the device queue 28. For example, the device queue 28 may hold the selected job until the higher priority jobs have been output. Then the selected job is released for outputting.

The commands sent between the queue manager and the queues in one embodiment are sent using proprietary or standardized network protocols such as Simple Network Management Protocol (SNMP)/Job Management Information Base (MIB) or Internet Printing Protocol (IPP). Extensions to these network protocols may be added to provide some of the functions described above. Alternatively, a custom network protocol is used to perform these operations.

The system described above can use dedicated processor systems, micro controllers, programmable logic devices, or microprocessors that perform some or all of the queue operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A method for managing multiple queues, comprising:
   monitoring status for jobs in a first queue on a first system;
   monitoring status for jobs in a second queue on a second system different than the first system, the first system and second system being located on different independently operating computing devices connected together through an Internet network or Local Area Network (LAN);
   managing the jobs in the first queue and the second queue from a same queue manager;
   receiving a select request to cancel one of the jobs;
   not knowing which of the first and second queue currently contains the job associated with the select request and accordingly sending a cancel request to both the first and second queue; and
   removing an identifier for the selected job from the queue manager when a cancel confirmation is received from either the first system or the second system.

2. A method according to claim 1 wherein the first system is a network server coupled to the network and the second system is a peripheral device coupled to the network and including:
   monitoring both the first queue on the network server and the second queue on the peripheral device remotely through the network so that jobs for the first and second queue appear together as a single displayed list of queue jobs;
   receiving user job requests that effect the status of jobs in both the first queue in the network server and the second queue in the peripheral device; and
   automatically controlling the jobs in both the first queue and second queue through commands sent over the network so that user job requests are conducted in conjunction with both the first queue and second queue at the same time.

3. A method according to claim 1 including displaying the jobs from the first queue and the second queue on a same user interface.

4. A method according to claim 3 including displaying on the user interface which of the first queue or the second queue is storing the different jobs.

5. A method according to claim 1 including:
   receiving a select request to cancel one of the jobs;
   identifying the first or second queue currently storing the selected job remotely over the network;
   sending a cancel request over the network to the identified queue;
   removing an identifier for the selected job from the queue manager when a confirmation is received over the network;
   sending a cancel request over the network to the other one of the first or second queue when a cancel failure is received over the network from the identified queue; and
   removing an identifier for the job from the queue manager when a confirmation is received over the network from the other one of the first and second queue.

6. A method according to claim 1 including:
   receiving a selection request to change priority for one of the jobs;
   sending a same query over the network to both the first and second system to determine which of the first or second queue is storing the selected job;
   sending a request to change priority of the selected job to the determined queue; and
   changing the priority identified for the job when a priority confirmation is received from the determined queue.

7. A method according to claim 6 including:
   receiving a request to move priority for the selected job on the first queue above priorities for other jobs stored on the second queue;
   sending a request over the network holding all jobs on the second queue having a priority below the priority requested for the selected job; and
   releasing the jobs on hold when a confirmation is received over the network from the second queue that the selected job has been promoted on the second queue.

8. A method according to claim 6 including:
   receiving a request to move the selected job on the first queue to a priority above other jobs stored on the second queue;

creating a slot in the second queue for the selected job; and moving the selected job to the slot in the second queue.

9. A method for managing multiple queues, comprising:
monitoring status for jobs in a first queue on a first system;
monitoring status for jobs in a second queue on a second system different than the first system, the first system and second system being located on different independently operating computing devices connected together through an Internet network or Local Area Network (LAN);
managing the jobs in the first queue and the second queue from a same queue manager;
receiving a request to demote a selected job on one of the first or second queue; placing a hold on the identified job;
identifying all jobs having higher priority than the selected job in both the first and second queue; and
removing the hold on the selected job after all the identified higher priority jobs in both the first and second queue have been output.

10. A computer for providing queue management, comprising:
a processor adapted to remotely monitor status of a server queue in a network server by sending server queue query messages over an Internet network or Local Area network and remotely monitor status of a device queue in a peripheral device by sending separate peripheral queue query messages over the network, the network server and peripheral device being separate devices operating at different locations on the network; and
a user interface adapted to display and manipulate the status of jobs in the server queue and device queue at the same time remotely over the network,
the processor further adapted to:
receive a select request to cancel one of the jobs;
send a cancel request to both the server and device queue while not knowing which of the server and device queue currently contains the job associated with the select request; and
remove an identifier for the selected job when a cancel confirmation is received from either the network server or the peripheral device.

11. A computer according to claim 10 wherein the processor receives a request from the user interface to cancel a job and sends a cancel request to the server queue or device queue storing the job.

12. A computer according to claim 11 wherein the processor removes the job from a single list of jobs displayed on the user interface when a confirmation is received from the server or device queue that the job is cancelled.

13. A computer according to claim 11 wherein the processor automatically sends a cancel request to the device queue when a cancel request to the server queue fails.

14. A computer according to claim 10 wherein the device queue in the peripheral device and the server queue in the network server operate independently and the processor receives a request from the user interface to change priority for a job and then sends separate requests to both the server queue and the device queue according to the priority change request in order to synchronize the request with jobs in the server queue and device queue.

15. A computer according to claim 10 wherein the user interface displays a single list of multiple jobs for both the server queue and device queue waiting to be output, the output status of the jobs, a priority for outputting the jobs, and the server queue or device queue where the individual jobs are currently residing and automatically synchronizing the displayed list of multiple jobs by sending requests to each of the server queue and device queue for the same user job requests.

16. A computer according to claim 10 wherein the jobs can be any one of a fax job, print job, scan job, or copy job.

17. A computer according to claim 10 wherein the peripheral device can be any one or combination of the following:
a copier;
a scanner;
a printer; or
a facsimile machine.

18. A system for managing jobs in queues, comprising:
a network server having a first queue for storing jobs;
a peripheral device having a second queue for storing jobs and outputting the jobs from the first queue and the second queue, the network server and the peripheral device being independently operating devices and the first queue and the second queue being independently operated queues that are not part of a same queuing device, the peripheral device for receiving jobs from the first queue over a Local Area Network (LAN) network or Internet network; and
a queue manager coupled to both the network server and the peripheral device through the network for displaying and managing the jobs both on the network server and the device through a same user interface so that jobs for the first and second queue appear together as a single displayed list of queue jobs, the queue manager for receiving user job requests that effect the status of jobs in both the first queue and second queue and automatically managing the jobs in both the first queue and second queue to correspond with the user job requests, the queue manager further adapted to:
receive a select request to cancel one of the jobs;
send a cancel request to both the first and second queue while not knowing which of the first and second queue currently contains the job associated with the select request; and
remove an identifier for the selected job from the queue manager when a cancel confirmation is received from either the network server or the peripheral device.

* * * * *